May 20, 1969 T. W. HOLDEN 3,445,791

REED TYPE AUDIO FILTER

Filed June 14, 1965 Sheet 1 of 2

INVENTOR.
THOMAS W. HOLDEN

BY Hill, Sherman, Meroni, Gross & Simpson
ATTORNEYS

May 20, 1969 T. W. HOLDEN 3,445,791

REED TYPE AUDIO FILTER

Filed June 14, 1965 Sheet 2 of 2

INVENTOR.
THOMAS W. HOLDEN

BY Hill, Sherman, Meroni, Gross & Simpson ATTORNEYS

United States Patent Office 3,445,791
Patented May 20, 1969

3,445,791
REED TYPE AUDIO FILTER
Thomas W. Holden, 301 W. 16th Place,
Chicago Heights, Ill. 60411
Filed June 14, 1965, Ser. No. 463,751
Int. Cl. H03h 9/00
U.S. Cl. 333—71 7 Claims

ABSTRACT OF THE DISCLOSURE

An audio frequency band pass filter which includes a base support, a plate of magnetic material carried on the base for movement relative thereto, and at least two reeds of magnetic material having their free ends extending over the base support and adjustable to be resonant at different frequencies. A pair of magnetic coils are secured to respective ones of a pair of core members which are secured to the base plate. Adjusting means are provided to adjust the position of each of the core members of the coils independently one from the other, and additional adjusting means is provided to adjust the cores of the coils simultaneously.

This invention relates to an adjustable audio frequency band pass filter adapted for use in radio-telegraph receivers and the like.

It is an object of the present invention to provide a band pass audio filter which will almost completely reject undesired frequency components while allowing the desired frequency band to pass.

Another object of the present invention is to provide a band pass audio filter which is adjustable to effect the band width of the desired band pass.

Another object of the present invention is to provide a band pass audio filter which has novel and improved means for adjusting the center frequency of the desired band pass without affecting the band width of the band pass.

Another object of the present invention is to provide a novel band pass audio filter.

Still another object of the present invention is to provide an audio frequency band pass filter which has means for selectively adjusting the frequency of maximum rejection.

Another object of the present invention is to provide a band pass audio filter which has an adjustable magnetic shunt for varying of the desired frequency range of the band pass and which has mechanical means for also varying the desired frequency range of the band pass.

A feature of the present invention relates to a nonmagnetic coating on a magnetic core to limit the power output of the band pass audio filter.

Other objects and features which I believe to be characteristic of my invention are set forth with particularity in the appended claims. My invention itself, however, both as to its organization, manner of construction, and method of operation, together with further advantages and objects thereof, may best be understood by reference to the following description taken in conjunction with the accompanying drawings, in which:

*As shown in the drawings*

Figure 1:
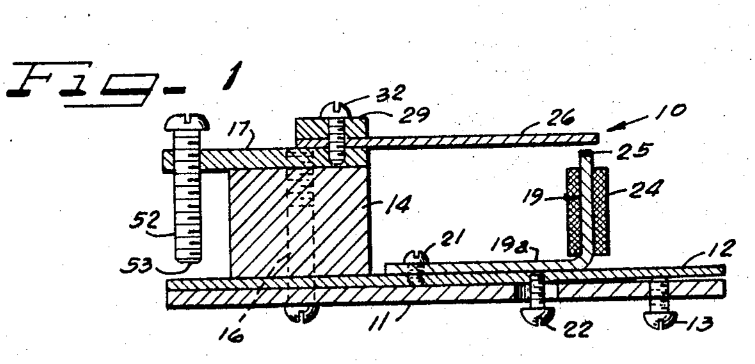
FIGURE 1 is a somewhat diagrammatic vertical sectional view of an audio frequency band pass filter in accordance with the present invention.
Figure 2:
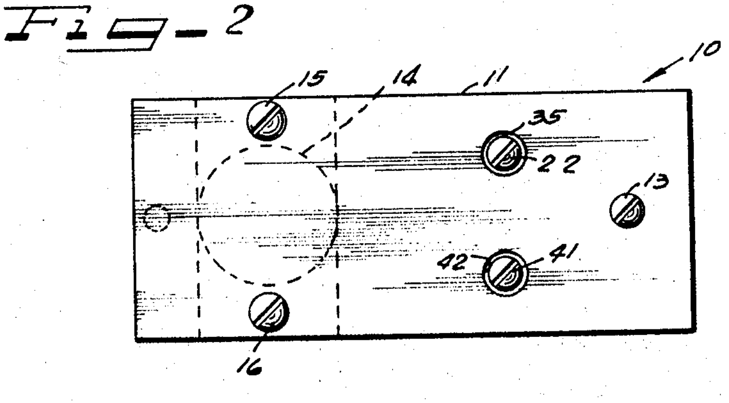
FIGURE 2 is a bottom plan view of the band pass filter structure of FIGURE 1.
Figure 3:
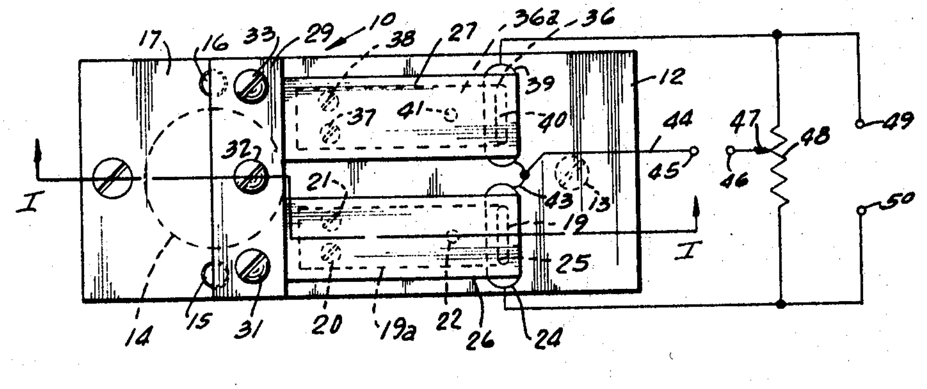
FIGURE 3 is a top plan view of the band pass filter structure of FIGURE 1, and with an electrical circuit shown in association therewith.

Shown in FIGURES 1, 2 and 3 is a band pass audio filter in accordance with the present invention and is designated generally by reference numeral 10. A rigid base 11 of magnetic material is provided for carrying a plate 12. Plate 12 is substantially rigid but is deflectable relative to the base 11. A screw 13 is threadedly carried by the base 11 and extends therethrough to engage the plate 12. A permanent magnet 14 is secured to the base 11 by a pair of bolts 15 and 16 which are threaded into a retainer plate 17, as seen in FIGURE 3. The bolts 15 and 16 are preferably of a non-magnetic material, while the retainer plate 17 is of a magnetic material. The bolts 15 and 16 and the threaded plate 17 serve to hold the base 11, plate 12 and magnet 14 firmly in place relative one to the other.

An L-shaped core 19 has a foot portion 19*a* which is secured to the plate 12 by a pair of screws 20 and 21 as seen in FIGURE 3. The foot portion 19*a* is substantially rigid but is deflectable relative to the plate 12. An adjusting screw 22 is threaded through the plate 12 and engages the bottom surface of the foot portion 19*a*. A coil 24 is carried about the core 19. The extreme upper end of the core 19 has a non-magnetic coating or bumper 25. A pair of reeds 26 and 27 of magnetic material are firmly held between the threaded retainer plate 17 and a bar 29 by a plurality of screws 31, 32 and 33. By way of example, the reed 26 may have a resonant vibration frequency of 950 cycles per second, and the reed 27 may have a resonant vibration frequency of 1000 cycles per second. Therefore, by the interaction of the reeds 26 and 27 with their associated coils the band pass filter 10 will pass a narrow band of frequencies which center about a frequency of 975 cycles per second.

A screw 22 passes substantially concentrically through an opening 35 in the base 11. Preferably, the diameter of the opening 35 is greater than the diameter of the head of the screw 22 so that the head of the screw 22 may pass through the opening 35 and abut the plate 12 when the screw 22 is threaded completely through the plate 12.

As seen in FIGURE 3, a second L-shaped core 36 is secured to the plate 12 by a pair of screws 37 and 38. The end of the reed 27 extends from the bar 29 and is adjacent the end of the core 36. A coil 39 is carried about the core 36. Secured to the extreme upper end of the core 36 is a bumper 40. A screw 41 passes substantially concentrically through an opening 42 in the base 11. Preferably, the diameter of the opening 42 is greater than the diameter of the head of the screw 41 so that the head of the screw 41 may pass through the opening and abut the plate 12 when the screw 42 is threaded completely through the plate 12.

As shown in FIGURE 3, the coils 24 and 39 are connected in series by a conductor 43. Connected to the conductor 43 is a conductor 44 which has the other end thereof connected to an output terminal 45. A second output terminal 46 is connected to a variable contact 47 of a potentiometer 48. The series connected coils 24 and 39 are connected in parallel with the potentiometer 48 and a pair of output terminals 49 and 50. The function of the input terminals 45–46 and the output terminals 49–50 may be exchanged as desired. That is, the input terminals 45–46 may serve as output terminals and the output terminals 49–50 may serve as input terminals.

As shown in FIGURE 1, a screw 52 is threadedly carried by the retainer plate 17 and extends toward the plate 12. The screw 52 serves as a magnetic shunt for the magnet 14 and will vary the amount of flux which travels through the reeds 26 and 27 dependent upon the gap 53 between the end of the screw 52 and the plate 12.

Figure 4:
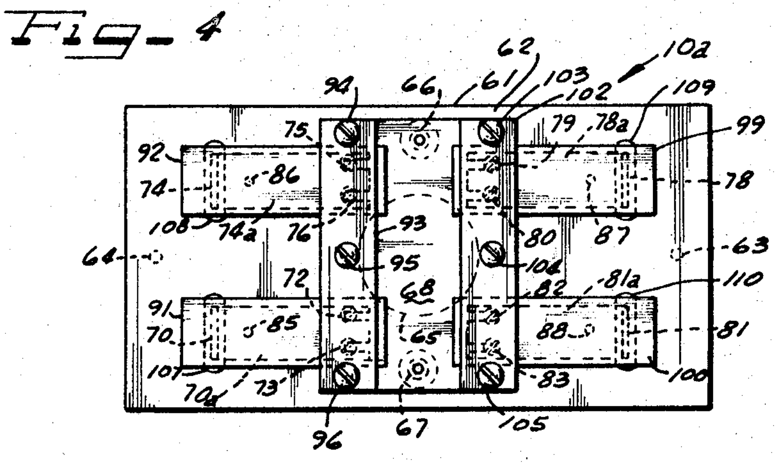
FIGURE 4 is a top plan view showing an alternate embodiment of the band pass filter shown in FIGURES 1, 2 and 3.
Figure 5:
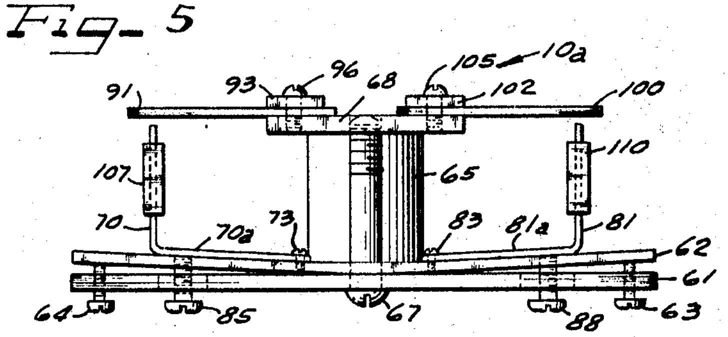
FIGURE 5 is a side elevational view of the band pass filter shown in FIGURE 4.

Shown in FIGURES 4 and 5 is an alternate embodiment of the band pass audio filter of FIGURES 1, 2 and 3 and is designated generally by reference numeral 10*a*. The band pass audio filter 10*a* has a base 61 of a magnetic material which supports and underlies a plate 62 also of magnetic material. The plate 62 is substantially rigid but is deflectable relative to the base 61. A screw 63 is threadedly carried by the base 61 and extends therethrough to engage the plate 62. A second screw 64 is located at the opposite end of the base 61 and is threadedly carried thereby to extend through the base 61 and engage the plate 62. A permanent magnet 65 is secured to the plate 62 by a pair of bolts 66 and 67 which are threaded into a retainer plate 68, as seen in FIGURE 4. The bolts 66 and 67 are preferably of non-magnetic material, while the retainer plate 68 is of magnetic material. The bolts 66 and 67 and the threaded retainer plate 68 serve to hold the base 61, plate 68 and permanent magnet 65 firmly together.

An L-shaped core 70 has a foot portion 70*a* which is secured to the plate 62 by a pair of screws 72 and 73. An L-shaped core 74 has a foot portion 74*a* secured to the plate 62 by a pair of screws 75 and 76. An L-shaped core 78 has a foot portion 78*a* which is secured to the plate 62 by a pair of screws 79 and 80. An L-shaped core 81 has a foot portion 81*a* which is secured to the plate 62 a pair of screws 82 and 83. The foot portions 70*a*, 74*a*, 78*a* and 81*a* are substantially rigid but are deflectable relative to the plate 62. Adjusting screws 85, 86, 87 and 88 are threadedly carried by the plate 62 to engage the leg portions 70*a*, 74*a*, 78*a* and 81*a* respectively.

A pair of resonant reeds 91 and 92 are held firmly at one end by the threaded plate 68 and a retainer plate 93. A plurality of screws 94, 95 and 96 pass through the retainer plate 93 and are threaded into the plate 68. In a similar manner, a pair of resonant reeds 99 and 100 are held firmly at one end by the threaded plate 68 and a retainer plate 102. A plurality of screws 103, 104 and 105 pass through the retainer plate 102 and are threaded into the plate 68.

Each of the magnetic cores 70, 74, 78 and 81 has a coil 107, 108, 109 and 110 respectively which will induce an alternating magnetic field into the corresponding core which, in turn, will vibrate the reed associated therewith when the frequency of the signal applied to the coil is substantially equal to the resonant frequency of the associated reed.

Figure 6:
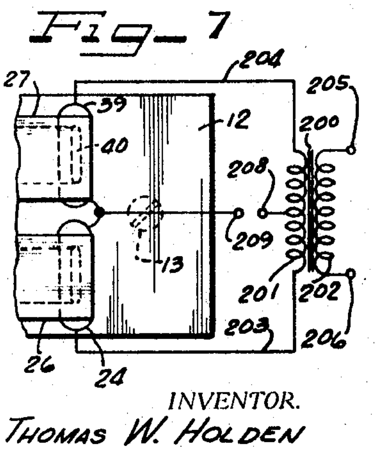
FIGURE 6 is a schematic circuit diagram of the band pass filter shown in FIGURES 4 and 5.

FIGURE 6 shows schematically the arrangement of components of the band pass audio filter of FIGURES 4 and 5. The coils 107, 108, 109 and 110 are connected to form a bridge circuit as shown. A pair of input terminals 115 and 116 are connected to circuit points 117 and 118 respectively. Connected to a movable contact 120 of a potentiometer 121 is one input terminal 123, while the other input terminal 124 is connected to a circuit point 125. The coil 107 has a core 70 which receives varying magnetic flux dependent upon the distance between the end of the core 70 and the extended portion of the reed 91. The band pass audio filter of FIGURES 4 and 5 may also be provided with an adjustable magnetic shunt, not shown, which would effect the magnetic flux within the core 70. The varying of the magnetic flux within the core 70 is shown diagrammatically as indicated by reference numeral 127 of FIGURE 6. In a similar manner, the varying of the magnetic flux within the cores 74, 78 and 81 are shown diagrammatically as indicated by reference numerals 128, 129 and 130 respectively. The end of the cores 70, 74, 78 and 81 may be coated with non-magnetic material to form a bumper similar to the bumpers 25 and 40 as shown in FIGURES 1 and 3. The non-magnetic coating on each of the cores keep the reed associated therewith from striking and sticking to the core. Also, the coating will limit the output of the audio filter. When head phones are used with the filter, it is desirable to limit the output amplitude in order to prevent the sound from causing discomfort to the ears.

The reeds 26 and 27, of FIGURES 1 and 3, and the reeds 91, 92, 99 and 100, of FIGURES 4 and 5, may be made from a semi-soft steel such as material used for audio transformer laminations.

*Summary of operation*

With the band pass audio filter of FIGURES 1, 2 and 3 connected to a source having a relatively wide range of audio frequency components, the reeds 26 and 27 may be adjusted to resonate at the same or respective different frequencies by changing the amount which the reed extends from between the retainer plate 17 and bar 29. Also, the resonant frequency of each of the reeds 26 and 27 may be adjusted by merely threading either the screw 22 or the screw 41 through the plate 12 thereby urging the cores 19 and 40 toward the extended portion of the respective reeds 26 and 27. This action will vary the reluctance of the two flux paths from the permanent magnet 14 through the cores 19 and 40. Still another method for adjusting the resonant frequency of the magnetic reeds 26 and 27 is provided by the screw 52. The screw 52 serves as an adjustable magnetic shunt which will bypass a portion of the flux from the permanent magnet 14, which would otherwise pass through the cores 19 and 40, in direct relation to the gap 53 between the end of the screw 52 and the plate 12.

By way of example, and not by way of limitation, the length of the reeds 26 and 27 may be adjusted to allow the reed 26 to be resonant at 950 cycles per second and the other reed 27 to be resonant at 1000 cycles per second. To adjust the audio filter for maximum rejection of an undesired frequency, the undesired frequency is applied to the input terminals 49 and 50, of FIGURE 3, and the movable contact 47 of the potentiometer 48 is adjusted to produce a minimum output signal at the output terminals 45 and 46. Thereafter, when a band of audio frequency components is applied to the input terminals 49 and 50 the desired output frequency will appear across output terminals 45 and 46 and all other frequency components will be reduced; however, the undesired frequency component is further reduced by virtue of the initial adjustment for maximum rejection of the undesired frequency component. By way of example, when the reed 26 is resonant at 950 cycles and the reed 27 is resonant at 1000 cycles the audio filter will pass the narrow band of frequencies which center about 975 cycles per second. If it is desired to allow a wider band of frequencies to pass through the audio filter, the resonant frequency of the reeds 26 and 27 may be adjusted by the screws 22 and 41 respectively.

When the core 19 is moved closer to the reed 26 by means of the adjusting screw 22, the resonant frequency of the reed 26 is decreased. In a similar manner, when the core 40 is moved away from the reed 27, the resonant frequency of the reed 27 is increased. Therefore, a great difference between the resonant frequency of the reeds 26 and 27 will produce a wide band pass through the audio filter 10, and a slight difference between the resonant frequency of the reeds 26 and 27 will produce a narrow band pass through the audio filter 10.

To adjust the audio filter 10 to pass a desired band of frequencies without changing the band width of the audio filter, the screw 13 is adjusted to shift the plate 12 in a direction to simultaneously change the distance between the end of the cores 19 and 40 and their respective reeds 26 and 27. Thus the resonant frequency of both the reeds 26 and 27 has been simultaneously increased or decreased to change the band pass center frequency but the filter band width will remain unchanged. It will be understood, that as the screw 13 is threaded out of the base 11 the elasticity of the plate 12 tends to position the plate 12 against the base 11.

One of the reeds 26 and 27 may be held against movement. In this case, the other reed will then determine the band width as well as the frequency of the band pass. However, when both of the reeds 26 and 27 are free to vibrate, the rejection of the undesired frequency is improved.

The band pass audio filter 10 may have the coils mounted on the magnet or a magnet may be used for each of the coils. In this case, the reeds 26 and 27 are mounted from the magnet on a magnetic spacer in order that they may be the same height as the top of the coil. Also, the filter may be split between the reeds and two permanent magnets similar to that of 14 can be used. The adjusting screws 13, 22 and 41 may be eliminated or may take another form to effect the adjustability of the band pass audio filter 10. The reeds 26 and 27 may in the alternative be driven by a coil arrangement as shown in my U.S. Patents 3,098,-986 and 3,098,987. Furthermore, a coil may be wound about the reeds 26 and 27 or placed near the reed in such a manner as to cause the reeds to be driven. The coils 24 and 39 may be connected in balanced opposition with respect to the frequencies outside of the desired band width, and the potentiometer 48 may be eliminated.

Figure 7:
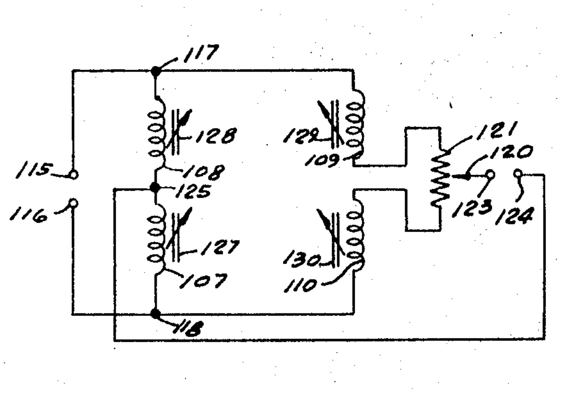
FIGURE 7 shows a modified coupling circuit arrangement of the circuit shown in FIGURE 3.

It should also be noted that the potentiometer 48 shown in FIGURE 3 may be replaced with any suitable inductance or capacitance coupling circuit. For instance, referring to FIGURE 7, the coupling circuit arrangement of the band pass filter of FIGURE 3 can be modified to include a transformer 200 having a center tapped winding 201 and another winding 202. A pair of ends 203 and 204 of the winding 201 are connected respectively to the coils 24 and 39, and the other winding 202 is connected to terminals 205 and 206, which can serve either as input terminals or output terminals. A center tap of the primary winding 201 is connected to a terminal 208, and the center lead between the coils 24 and 39 is connected to a terminal 209. The terminals 208 and 209 can serve either as input terminals or output terminals as desired in corresponding relation to the terminals 205 and 206. In the arrangement shown in FIGURES 3 and 7, both reeds 26 and 27 must be tuned to different frequencies to produce an output at the output terminals. Should the resonant frequency of the reeds 26 and 27 be similar there will be zero output at the output terminals. Also, one of the reeds 26 or 27 may be held against motion and the other of the reeds allowed to vibrate to develop a signal at the output terminal.

Reference is now made to FIGURES 4, 5 and 6. By way of example, the reeds 91 and 99 may be adjusted to resonate at 950 cycles per second and the reeds 92 and 100 may be adjusted to resonate at 1000 cycles per second. In this instance, the band pass audio filter will pass a narrow band of frequencies which center about 975 cycles per second. As shown in FIGURE 6, the components of the band pass audio filter 10 and a potentiometer 121 are connected to form a bridge circuit. When a frequency component outside of the desired band pass is applied to the input terminals 115 and 116, the coils 107, 108, 109 and 110 are maintained substantially in balance and little or no output is obtained from the output terminals 123 and 124. If it is desired to eliminate completely a particular frequency component outside of the band pass, the potentiometer 121 is adjusted so that zero output is obtained between the terminals 123 and 124 with an input of frequency equal to that of the undesired frequency component. Therefore, when a broad band of frequency is applied to the input terminals 115 and 116, an output will be obtained between the terminals 123 and 124, the frequency of which is determined by the resonant frequency of the reeds 91, 92, 99 and 100. The undesired frequency component of maximum rejection will not appear between the output terminals 123 and 124.

It is understood from the previous detailed description of FIGURES 1–3, that the resonant frequency of each reed may be individually varied by adjusting the corresponding screw 85, 86, 87 or 88. Also, when it is desired to change the desired frequency range of the band pass while at the same time maintaining the filter band width constant, there has been provided the adjusting screws 63 and 64, each of which simultaneously increases or decreases the resonant frequencies of the reeds 99, 100 and 91, 92, respectively.

It will be apparent that many modifications and variations may be effected without departing from the spirit and scope of the novel concepts of this invention.

I claim as my invention:

1. An audio frequency band pass filter comprising:
a pair of reed means having vibrating portions of magnetic material being resonant at respective different audio frequencies which define a desired band pass width,
coil means coupled to the vibrating portions of each of said reed means, and including core means cooperating respectively with each of said reed means,
magnetic means for producing a magnetic flux threading said coil means,
transformer coupling means having first and second windings, said first winding coupled to said coil means and including a center tap,
a pair of input terminals connected to said coil means and said center tap on said first winding to receive input signals,
said transformer second winding connected to a pair of output terminals for coupling from said filter a desired band of frequencies,
means for individually adjusting the space between each of said core means and the respective reed to vary the resonant frequency of said reed, and
means for simultaneously adjusting the resonant frequency of said reed means to vary the center frequency of the filter band pass.

2. An audio frequency band pass filter comprising:
a support member,
a plate of magnetic material carried by said member and deflectable relative thereto,
at least four reeds of magnetic material each of said reeds having free ends adjusted to resonate at different frequencies,
means for mounting said reeds to extend said free ends in operative position above said plate,
bridge coupled coil means having core means connected to said plate and extending toward the free ends of corresponding reeds to maintain a space therebetween, first adjusting means for individually varying the resonance frequency of each of said reeds to define a filter band width, and
second adjusting means for each pair of said reeds to simultaneously vary the resonant frequencies of each of said reed pairs.

3. An audio frequency band pass filter comprising:
a support plate of magnetic material,
reed means having free ends and adjusted to resonate and define a range of band pass frequencies,
means for mounting said reed means to extend said reed free ends in operative position above said plate,
coil means having L-shaped core means including a foot portion and an upright leg portion, said foot portion being rigidly connected at one end thereof to said support plate with said leg portion extending towards the free ends of said reed means such that a space is maintained therebetween, and
means engaging said foot portion and said support plate to vary the resonant frequency of said reed means,
circuit means connected with said coil means to provide a bridge circuit arrangement having a first set of terminals serving as bridge input terminals and a second set of terminals serving as bridge output terminals, the output at the bridge output terminals exhibiting a band pass characteristic as a function of frequency for input frequency components supplied to the bridge input terminals by virtue of said range of band pass frequencies defined by said reed means, said circuit means comprising an adjustable impedance element connected with said coil means and controlling balance of said bridge circuit arrangement with respect to an undesired frequency component at the bridge input terminals which undesired frequency component is outside said range of band pass frequencies, said adjustable impedance element being manually adjustable for maximum rejection of a selected undesired frequency component outside said range of band pass frequencies to minimize the undesired frequency component at the bridge output terminals.

4. An audio frequency band pass filter comprising:

a support plate of magnetic material, reed means comprising a pair of reeds having free ends and adjusted to resonate and define a range of band pass frequencies, means for mounting said pair of reeds to extend said reed free ends in operative position above said plate, coil means comprising respective electric coils each having L-shaped core means including integral foot and leg portions, said foot portion being rigidly mounted at one end thereof to said plate with said leg portion extending towards the free end of one of said pairs of reeds such that a space is maintained therebetween, and means engaging said core means foot portion to deflect said core means foot portion to thereby change the space between said leg potrion and said reed free end so as to vary the resonant frequency of said reed means, circuit means connected with said coils to provide a bridge circuit arrangement having a first set of terminals serving as bridge input terminals and a second set of terminals serving as bridge output terminals, the output at the bridge output terminals exhibiting a band pass characteristic as a function of frequency for input frequency components supplied to the bridge input terminals, by virtue of said range of band pass frequencies defined by said reed means, said circuit means comprising an adjustable potentiometer connected across both of said coils in series, having its fixed outer terminals connected with respective outer terminals of the series-connected coils and with one of said first and second sets of terminals, and the variable tap on the potentiometer and the common terminal of the series-connected coils being connected with the other of said first and second sets of terminals, said adjustable potentiometer controlling balance of said bridge circuit arrangement with respect to an undesired frequency component at the bridge input terminals which undesired frequency component is outside said range of band pass frequencies, said adjustable potentiometer being manually adjustable for maximum rejection of a selected undesired frequency component outside said range of band pass frequencies to minimize the undesired frequency component at the bridge output terminals.

5. An audio frequency band pass filter comprising:

a support plate of magnetic material, at least two reeds of magnetic material, said reeds having free ends and being adjusted to resonate at different frequencies, a pair of coil means each having L-shaped core means including a foot portion and a leg portion, said foot portion being rigidly connected at one end thereof to said support plate with said leg portion extending towards the free end of the corresponding reed such that a space is maintained between the core and the free end of said corresponding reed, and means for individually adjusting the space between a core and the free end of the corresponding reed to individually vary the resonant frequency of each of said reeds, circuit means connected with said coil means to provide a bridge circuit arrangement having a first set of terminals serving a bridge input terminals and a second set of terminals serving a bridge output terminals, the output at the bridge output terminals exhibiting a band pass characteristic as a function of frequency for input frequency components supplied to the bridge input terminals by virtue of said range of band pass frequencies defined by said reed means, said circuit means comprising an adjustable impedance element connected with said coil means and controlling balance of said bridge circuit arrangement with respect to an undesired frequency component at the bridge input terminals which undesired frequency component is outside said range of band pass frequencies, said adjustable impedance element being manually adjustable for maximum rejection of a selected undesired frequency component outside said range of band pass frequencies to minimize the undesired frequency component at the bridge output terminals.

6. In an audio frequency band pass filter having reed means adjusted to resonate at a range of band pass frequencies, and having a pair of coils arranged in respective magnetic circuits with said reed means so as to transmit frequency components with a corresponding band pass characteristic, circuit means connected with said coils to provide a bridge circuit arrangement having a first set of terminals serving as bridge input terminals and a second set of terminals serving as bridge output terminals, the output at the bridge output terminals exhibiting a band pass characteristic as a function of frequency for input frequency components supplied to the bridge input terminals by virtue of said range of band pass frequencies defined by said reed means, said circuit means comprising resistor means connected with said coils and controlling balance of said bridge circuit arrangement with respect to an undesired frequency component at the bridge input terminals which undesired frequency component is outside said range of band pass frequencies, and said resistor means being selected in value for maximum rejection of a selected undesired frequency component outside said range of band pass frequencies to minimize the undesired frequency component at the bridge output terminals.

7. In an audio frequency band pass filter having reed means adjusted to resonate at a range of band pass frequencies, and having a pair of coils arranged in respective magnetic circuits with said reed means so as to transmit frequency components with a corresponding band pass characteristic, and said coils being connected in series to provide a common terminal between the two coils, and respective outer terminals at respective opposite ends of the coils from the common terminal, circuit means connected with said coils to provide a bridge circuit arrangement having a first set of terminals serving as bridge input terminals and a second set of terminals serving as bridge output terminals, the output at the bridge output terminals exhibiting a band pass characteristic as a function of frequency for input frequency components supplied to the bridge input terminals, by virtue of said range of band pass frequencies defined by said reed means, said circuit means comprising an adjustable potentiometer connected across both of said coils in series, having its fixed outer terminals connected with respective outer terminals of the series-connected coils and with one of said first and second sets of terminals, and the variable tap of the potentiometer and the common terminal of the series-connected coils being connected with the other of said first and second sets of terminals, said adjustable potentiometer controlling balance of said bridge circuit arrangement with respect to an undesired frequency component at the bridge input tenminals which undesired frequency component at the bridge input terminals which undesired component is outside said range of band pass frequencies, said adjustable potentiometer being manually adjustable for maximum rejection of a selected undesired frequency component outside said range of band pass frequencies to minimize the undesired frequency component at the bridge output terminals.

References Cited

UNITED STATES PATENTS

| | | | |
|---|---|---|---|
| 3,290,609 | 12/1966 | Shreve | 330—1 |
| 3,098,987 | 7/1963 | Holden | 333—71 |
| 3,098,986 | 7/1963 | Holden | 333—71 |
| 3,150,337 | 9/1964 | Allison | 333—71 |
| 3,138,755 | 6/1964 | Kompelien | 333—71 |

HERMAN KARL SAALBACH, *Primary Examiner.*

C. BARAFF, *Assistant Examiner.*

U.S. Cl. X.R.

178—47; 333—70